No. 656,401. Patented Aug. 21, 1900.
C. V. FYKE.
STAMP CANCELING AND POSTMARKING MACHINE.
(Application filed Oct. 18, 1898.)
(No Model.) 7 Sheets—Sheet I.
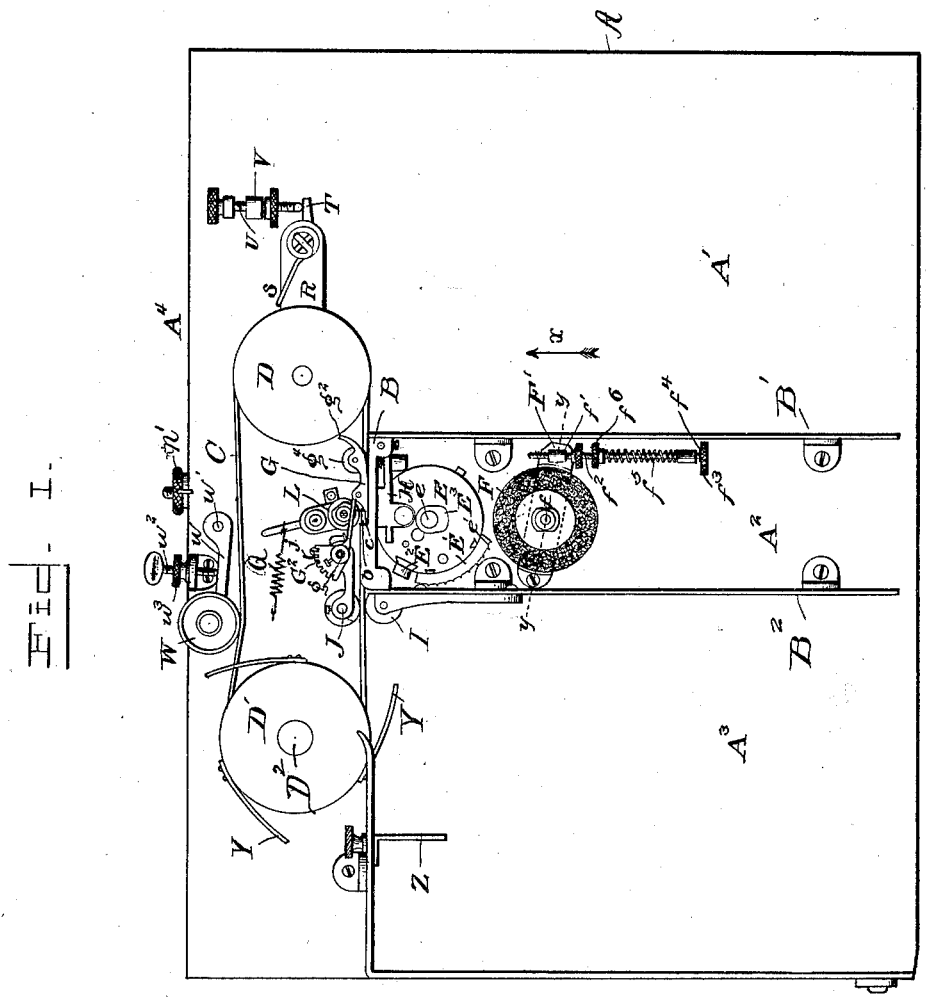
Witnesses
John T. Heufferwiel.
N. Curtis Lammond
Inventor
Charles V. Fyke,
by H. H. Bliss
Attorney No. 656,401. Patented Aug. 21, 1900.
C. V. FYKE.
STAMP CANCELING AND POSTMARKING MACHINE.
(Application filed Oct. 18, 1898.)
(No Model.) 7 Sheets—Sheet 2.
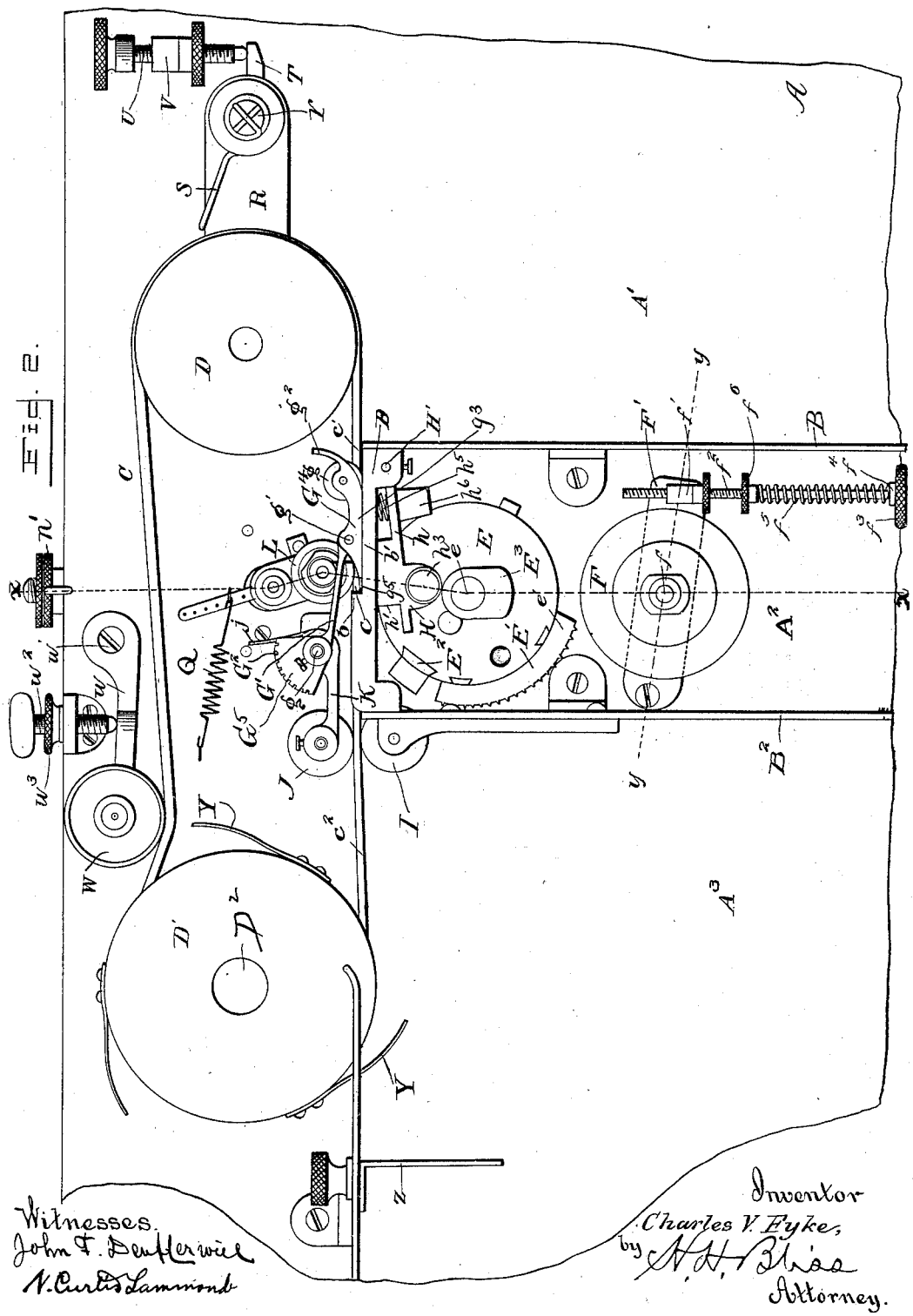
Witnesses
John F. Deutlerwich
N. Curtis Lammond
Inventor
Charles V. Fyke,
by N. H. Bliss
Attorney.

No. 656,401. Patented Aug. 21, 1900.
C. V. FYKE.
STAMP CANCELING AND POSTMARKING MACHINE.
(Application filed Oct. 18, 1898.)
(No Model.) 7 Sheets—Sheet 3.
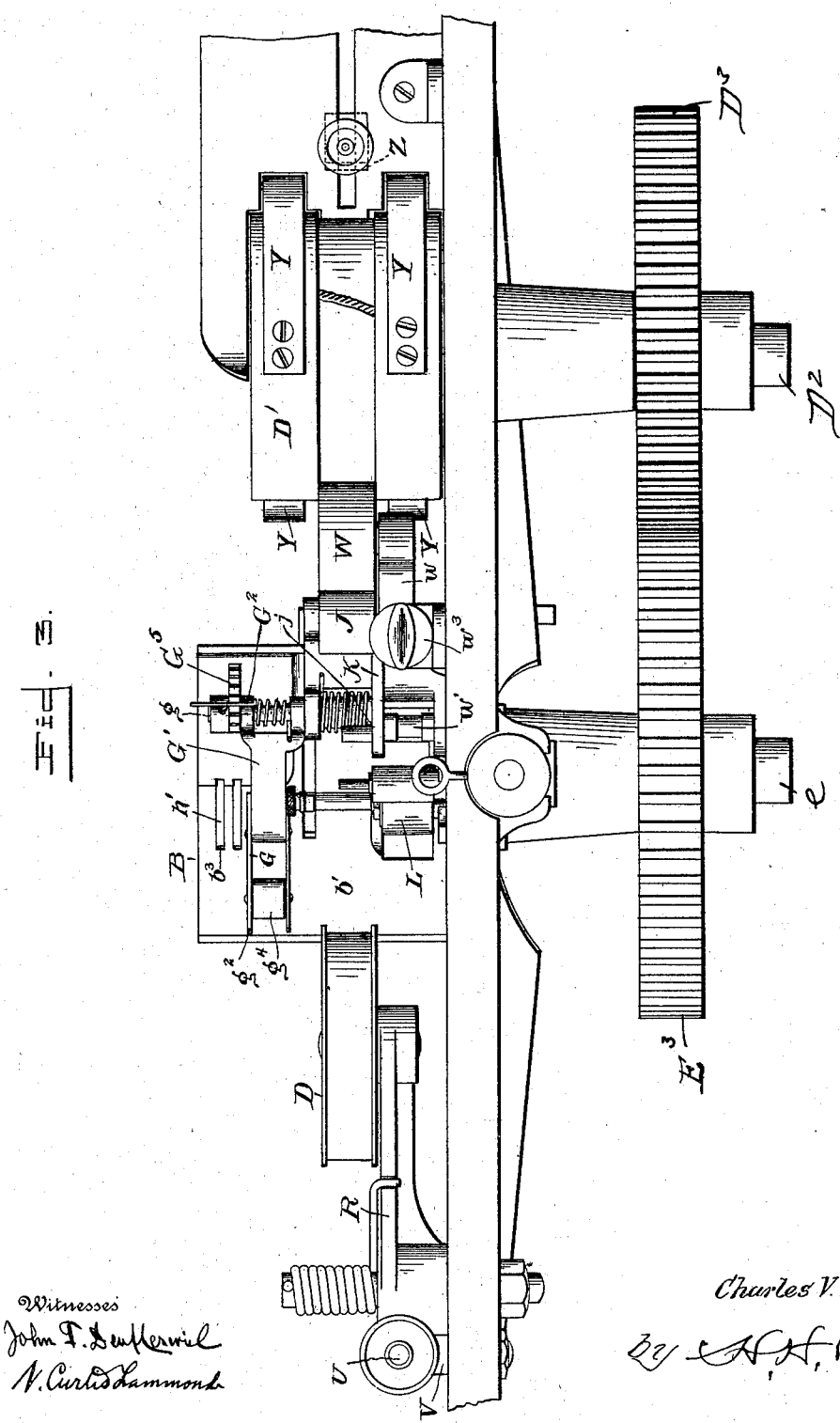
Witnesses
John T. Sutherwil
N. Curtis Hammond
Inventor
Charles V. Fyke,
by A. H. Bliss
Attorney No. 656,401. Patented Aug. 21, 1900.
C. V. FYKE.
STAMP CANCELING AND POSTMARKING MACHINE.
(Application filed Oct. 18, 1898.)
(No Model.) 7 Sheets—Sheet 4.
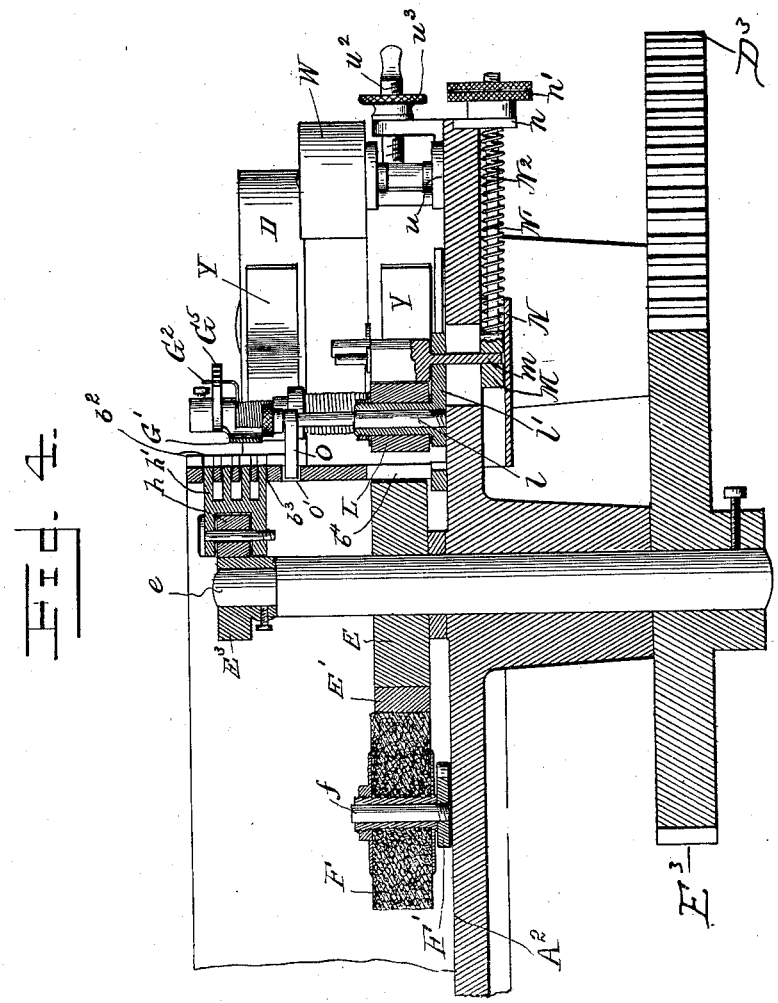
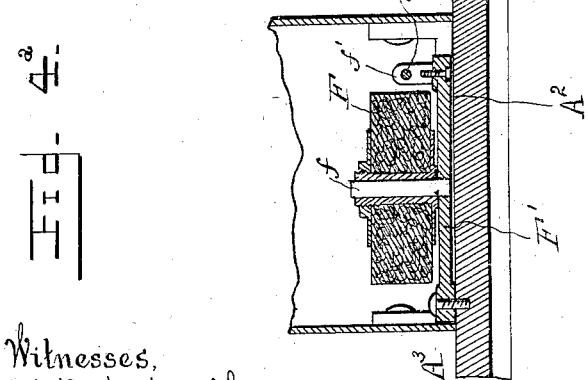
Inventor,
Charles V. Fyke,
by A. H. Bliss
Attorney.

No. 656,401. Patented Aug. 21, 1900.
C. V. FYKE.
STAMP CANCELING AND POSTMARKING MACHINE.
(Application filed Oct. 18, 1898.)
(No Model.) 7 Sheets—Sheet 5.

Witnesses
John T. Deufferwiel
N. Curtis Lammont

Inventor
Charles V. Fyke,
By H. H. Bliss
Attorney

No. 656,401. Patented Aug. 21, 1900.
C. V. FYKE.
STAMP CANCELING AND POSTMARKING MACHINE.
(Application filed Oct. 18, 1898.)

(No Model.) 7 Sheets—Sheet 6.

Witnesses
John F. Deuflerweil
N. Curtis Lammond

Inventor
Charles V. Fyke,
by A. H. Bliss
Attorney

UNITED STATES PATENT OFFICE.

CHARLES V. FYKE, OF KANSAS CITY, MISSOURI.

STAMP-CANCELING AND POSTMARKING MACHINE.

SPECIFICATION forming part of Letters Patent No. 656,401, dated August 21, 1900.

Application filed October 18, 1898. Serial No. 693,894. (No model.)

*To all whom it may concern:*

Be it known that I, CHARLES V. FYKE, a citizen of the United States, residing at Kansas City, in the county of Jackson and State of Missouri, have invented certain new and useful Improvements in Stamp-Canceling and Postmarking Machines, of which the following is a specification, reference being had therein to the accompanying drawings.

Figure 5:
Figure 6:
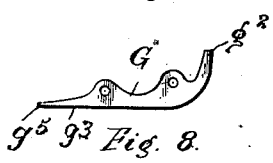
Figure 7:
Figure 8:
Figure 9:
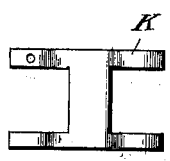
Figure 10:
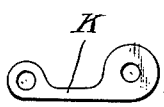
Figure 11:
Figure 12:
Figure 13:
Figure 14:
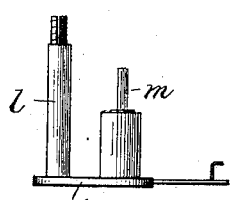
Figure 15:
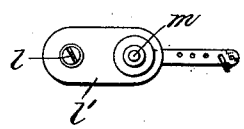
Figure 17:
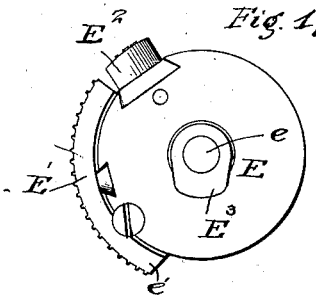
Figure 16:
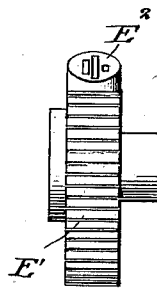
Figure 18:
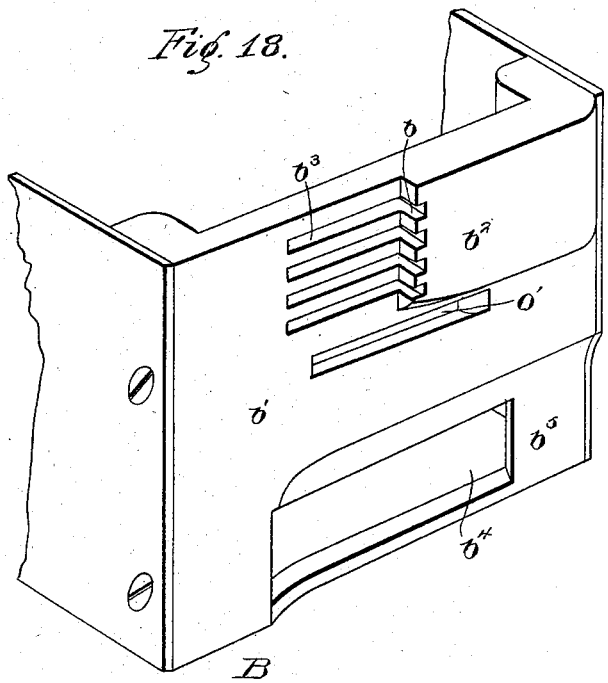
Figure 19:
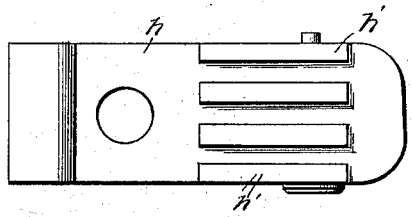
Figure 20:
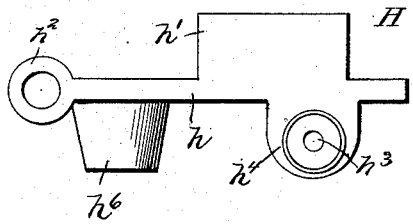
Figure 21:
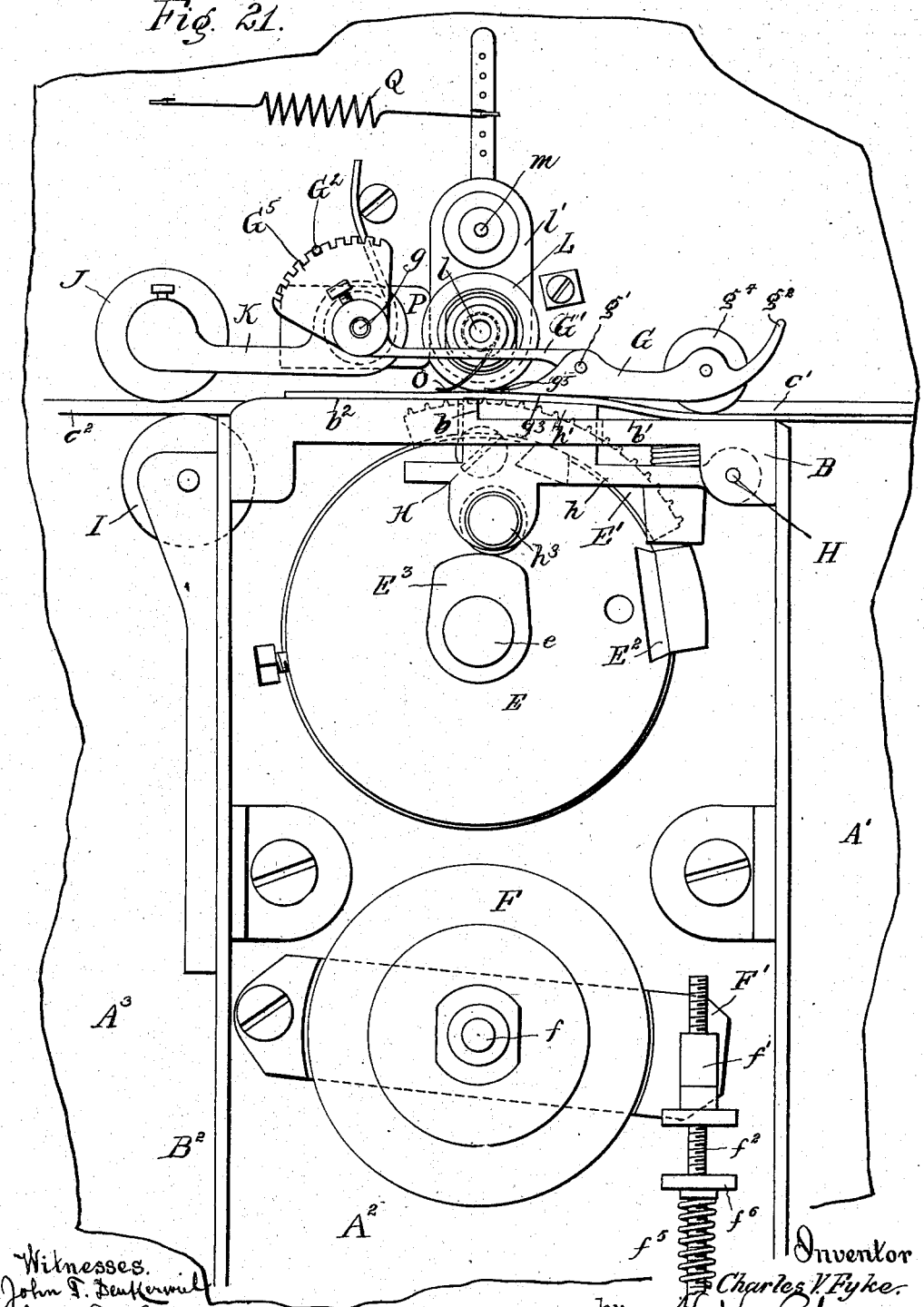

Figure 1 is a plan view of a machine embodying my improvements for postmarking letters, canceling stamps, and similar purposes. Fig. 2 is a plan view, on a larger scale, of the more important parts of the mechanism. Fig. 3 is an elevation of that part of the machine shown in Fig. 2, looking at it from the inner side. Fig. 4 is a section on the broken line $xx$ of Fig. 2. Fig. $4^a$ is a section on the line $yy$ of Fig. 2. Figs. 5 and 6 show the pressure-plate detached. Figs. 7 and 8 show the carrier for said plate detached. Figs. 9 and 10 show the carrier for a pressure-roller. Figs. 11 and 12 show the spring locking-segment. Figs. 13, 14, and 15 show the platen-roll and its vibrating support. Fig. 16 is an edge view, and Fig. 17 a plan view, of the die and type-carrier and the rotary hub or support therefor. Fig. 18 is a perspective of the wall or plate against which the letters are fed by the feeding device. Fig. 19 is a face view of the letter-releasing device. Fig. 20 is a top view of the same. Fig. 21 is a plan view of the principal parts of the machine on a full-sized scale, showing them in the position occupied when the letter is passing through.

A indicates a main base-plate or table which serves not only to hold the moving operative parts of the mechanism, but also to provide a table or holder for the letters before, during, and after the canceling, printing, marking, or like operation. Guided by this main plate or table and the relative positions of the parts thereto attached one can regard the machine as a whole as having four well-defined spaces, areas, or compartments, each indicated as a whole by $A'$, $A^2$, $A^3$, and $A^4$. The space or compartment at $A'$ is adapted to receive a letter, card, suitably-shaped package, or other similar article, to which are to be applied printed or stamped characters or canceling-marks, &c., and also adapted to receive a larger or smaller pack of such cards, letters, or the like arranged face to face. The space or compartment $A^2$ holds the mechanism by which the printing, marking, stamping, or canceling is immediately effected. That at $A^3$ is a space or compartment into which the letters or the like are delivered from the printing, stamping, or canceling mechanism. That at $A^4$ is the one containing the letter-advancing mechanism as well as some of the parts which govern the letter in its passage through the machine and of those which provide an abutment or platen-like resistance to the printer. Between the spaces or compartments at $A^2$ and $A^4$ there is a passage-way along which the letter travels when moving from the initial receptacle at $A'$ to the final receptacle at $A^3$. These several parts or regions of the machine are more or less separated by walls or partition devices, one, $B'$, rising from the base-plate or table A and situated between the spaces $A'$ and $A^2$, another at $B^2$ lying between the spaces $A^2$ and $A^3$, and still another at B arranged between the spaces $A^2$ and $A^4$, and some of the devices of the letter-advancing mechanism (which in this construction includes an endless belt) may be regarded as a wall or letter-stopping device between the space at $A^4$ and that at $A'$, on the one hand, and between that at $A^4$ and $A^3$, on the other hand. The letters when in a pack are initially pushed forward in the direction of the arrow X toward the inner end of the space or compartment $A'$. The inner ends of the letters are thus brought successively into such positions that one of the broad faces of the innermost letter comes into contact with the letter-advancing mechanism, which is constructed and arranged as follows:

C is an endless belt of suitable width and arranged to travel with its wider faces parallel to and with some pressure against the innermost face of the wall B, which serves not only, as above stated, as a device to divide the space at $A^2$ from that at $A^4$, but also serves as an active element in furnishing pressure in opposition to the letter-advancing mechanism and in retaining the letter at certain times against advance. The feeding-belt C is supported upon a pulley or drum D on the receiving side of the machine and a second pulley or drum D' on the delivery side. It is so situated as to have at all times a portion $c'$ at the inner end of the initial receiving-space A', a portion $c^2$ at the inner end of the final receiving-space $A^3$, and a portion $c$ adjacent to and pressing somewhat against the aforesaid abutment-wall B. Power is preferably applied to the shaft $D^2$ of pulley D' through gear-wheel $D^3$, mounted and fixed thereon, said gear-wheel being rotated in any suitable manner from mechanism not shown. The portion $c'$ of the belt is preferably reduced in length relative to the length of ordinary letters or like articles, so that the frictional advancing force exerted by it upon the inner face of the innermost letter of the ingoing pack shall be reduced as much as is advantageous, this assisting in attaining a perfect separation of said innermost letter from the following ones of the pack and preventing more than one letter from entering the passage-way at one time. When the operator is pushing the letter or the pack inward, the portion $c'$ of the belt yields slightly at the points where it is adjacent to the inner end of the wall B', and this allows the forward end of the letter to gain entrance into the passage-way. As soon as it does so enter the efficiency of the frictional feed action is increased, the letter being now gripped between the belt and the surface of the wall B. When it reaches the proper position, it has its stamp canceled and a postmark applied, or it can have characters of any desired sort placed upon it by a printing, embossing, or similar action.

E indicates a hub or heavy disk mounted on a vertical axis, on which is also secured a gear-wheel $E^3$, in mesh with and receiving rotation from gear-wheel $D^3$. Said disk is provided with any suitable printing, stamping, canceling, marking, or other devices. As shown, it has a stamp-canceling die at E' and a die or type-carrier at $E^2$, by which postmarks or the like can be applied to the letter. Its shaft $e$ is at such line that when the dies or type are rotating their active surfaces revolve in a path intersecting a short distance the letter-path, so that they will not only contact with a face of the letter, but will exert more or less pressure thereon. These printing or marking devices are inked at each rotation by the inking roller or pad F, which is mounted on a pin at $f$. This pin is secured to an adjustable plate or carrier F'. It can be moved toward or from the dies by means of a nut $f'$ and a threaded rod $f^2$, which extends outward to the edge of the machine and is provided with a thumb-head $f^3$, the rod being loosely mounted in a guide-support $f^4$. $f^5$ is a spring around the rod bearing against the guide $f^4$ and against an adjustable stop $f^6$. These parts can be so adjusted as to hold the inking pad or roller F at points where the dies can press against it and be properly supplied with ink, and yet so as to permit the inking-pad to yield backward in the event of undesirable pressure from the die. The forward end $e'$ of the die comes into contact with the letter at the proper instant, the latter being held in the passage-way against advancing by a shoulder or projection $b$, preferably part of or rigidly secured to the wall B. The form of the innermost face of this wall B will be readily understood upon inspection of Figs. 2 and 18. It has a main surface, (indicated by $b'$,) along which the letter travels when it first enters the passage-way. It also has a surface at $b^2$, this being provided by the aforesaid projection furnishing the shoulder at $b$, or it may be regarded as being recessed at that part which is adjacent to the receiving end of the passage-way and thickened or projected rearward at the part which is adjacent to the exit from the passage-way. The feed-belt travels normally in the plane of the surface $b'$, the horizontal planes of the belt being below the surface $b^2$ and shoulder $b$. Devices are present which normally tend to press each incoming letter (supplemental to the pressing of the belt) toward the recessed portion of the wall or plate B. As shown, these comprise a plate G, a carrier-arm G', and a support at $g$. The carrier-arm G' is pivotally connected to the support $g$, and it is hinged or pivoted to the plate G by a pin at $g'$. The plate G has a curved outer end at $g^2$ and a flat pressure-face $g^3$. The curved part $g^2$ is so shaped and so related to the recessed surface of the wall B as to provide an inward narrowing throatway through which the letter is guided to a position between the pressure-surface $g^3$ and the recessed part of the wall B. To overcome friction from the outer part of the plate G, a roller $g^4$ is mounted therein in such way as to assist the letter in passing. A slight spring-pressure is constantly imparted to the plate G by the spring $G^2$, which is coiled around the pin $g$ and has one end bearing against the arm G', the other end being adjustably locked in a segment-plate $G^5$. It will now be seen that as each letter enters the passage-way it is held by the plate G against the surface $b'$, and therefore be so guided that its forward end must impinge upon and be stopped by the shoulder $b$, and it is held under such stoppage until the forward end $e'$ of the die comes around to the tangent plane of the letter-surface, said end of the die beginning to act in or approximately in the radial plane of the axis $e$ perpendicular to the letter-path. It now becomes necessary to release the letter from the shoulder $b$, as it must advance with the same speed as the peripheral speed of the die, and such release is accomplished as follows:

H indicates a releasing device, it being a swinging pusher adapted to engage with the outer face of the letter and push the letter bodily toward the belt. It may be of any suitable form. As shown, it consists of a bar or plate $h$, with presser fingers or plates $h'$. It is held by a pivot at H', passing through the eye $h^2$. The presser fingers or plates $h'$ can reciprocate through slots $b^3$, formed in the wall B, these slots extending through the recessed part $b'$ and preferably also extending somewhat into the thicker portion at $b^2$. The releasing device H is intermittingly moved outward—that is, toward the belt—by a cam $E^3$ on the hub of the printing device or secured to its shaft $e$. Preferably an antifriction-roller $h^3$ is employed, mounted in ears $h^4$ on the part H. This releasing device is normally pressed backward by the plate G, either by direct contact or through an intervening letter. Hence the releasing device is moved in one direction by the cam $E^3$ and in the other by the spring-held plate G. I also employ a spring $h^5$, seated in socket $h^6$ and contacting with the rear of wall B, for pressing back and retaining the releasing device in its normal retracted position. The cam $E^3$ is so placed that it imparts its outward movement to the releasing device H just as the forward end $e'$ of the die reaches the line where it is ready to act—that is to say, the releasing device pushes the forward end of the letter outward against the belt far enough to release it from the shoulder $b$, and thereupon instantly the letter begins to again advance simultaneously with the rotation and action of the printing devices.

By employing a stationary stop for the letter and a positively-acting device for pushing the letter away from the stop I attain many advantages over and results superior to those attained by the machines wherein use is made of letter-stops which move into and out from the letter-passage. Much trouble has been experienced with machines of the latter sort owing to the fact that as the letters enter the passage-way and approach the die (which they do with great rapidity) their impact upon the movable stops is such that their forward ends are bent, crumpled, and marred and in many cases are torn. In the present construction I am enabled to provide a long stopping-surface, and by means of the yielding plate G, I can bring the letters gradually to a stop, the toe $g^5$ of this plate fitting snugly in the angle of the shoulder $b$ and preventing the outward bending, wrinkling, or tearing of the letter end, and the releasing device H is of such nature that the force which pushes the end of the letter away from the stop is distributed over a large surface, the letter being clamped between two relatively-broad holders—namely, the plate G and the releasing device H—and therefore the strain from the belt is not permitted to harm the envelop, card, paper, or the like, even when the latter is at a dead-stop.

The plate G is pivoted to its carrier $G'$ at a point somewhat remote from the toe end $g^5$, and several desirable results are thus attained. This allows the plate G to conform in position to the position of the active surfaces of the releasing fingers or plates $h'$ of the releasing device H, and hence the expanded gripping-surface between the parts G and H at the forward end of the letter is maintained in its full area, which might not be the case if both of these parts should swing in separate and fixed arcs. By having the releasing fingers or plates $h'$ extend into and pass through the thicker part at $b^2$ of the wall B, I insure that the very front line or edge of each letter shall be carried entirely clear of the outer corner of the shoulder $b$ and delivered to the advancing-belt in such way that marring is still further avoided. By examining Fig. 21 it will be noticed that when looked at in plan view these releasing fingers or plates $h'$ extend beyond the toe $g^5$. The pressure exerted by the plate G should be reduced as much as possible, as the resisting force thereof is so much detracted from the efficiency of the belt. A delicate adjustment in this respect can be attained through the notched segment $G^5$. As above stated, as soon as the letter is released from the stop $b$ it rapidly passes toward the final receiving chamber or space $A^3$. The friction upon one face can now be reduced, as by the employment of a roller, such as that at I, for the letter to bear against, and the pressure of the belt is increased by a spring-pressed roller J. This is held in a carrier K, mounted on the above-described pivot $g$, and against it bears a spring $j$.

Description has been given above of the printing device proper; but in machines of this class there should be present also for the best results a pressure device adapted to bear against the letter, card, or paper in opposition to the printer. Such a pressure-roller is shown at L. It may be made of any suitable material. It is loosely mounted on the pin $l$. The latter is secured to a plate or support $l'$. This support is pivoted at $m$ to a carrier M, the latter being mounted so as to slide in a guideway at N, preferably below the table A. The carrier M is connected to a threaded rod $N'$, which passes through a guide at $n$ and at the outer end has an adjusting-head $n'$. The rod $N'$ is surrounded by a coiled spring $N^2$. By turning the head $n'$ the carrier M can be adjusted to any desired position; but in whatever position it may be placed it is capable of yielding outward against the pressure of the spring $N^2$. This latter feature provides for the passage of any large, thick, or bulky articles through the passage-way, for when the die comes to bear upon such articles they press against the roll L and it pushes the support $l'$ and the carrier M outward against the tension of the spring $N^2$. In order to avoid transferring ink from the die to the pressure-roll L when no letter is between them, said roll and its support $l$ are mounted upon the aforesaid pivot $m$—that is to say, they can rock back and forth with relation to the carrier M and with relation to the letter-path. After a letter has entered the passage-way and it becomes desirable to print or mark it it is necessary to bring the platen-roll L to its active position in opposition to the die. This is done by the letter-actuated mechanism, and in the present construction I have introduced what I believe is the simplest form known of mechanism for automatically bringing the platen-roll into position under the influence of the advancing letter. The shaft-pin $l$ of the roller L is extended up a suitable distance, and to its upper end is attached a relatively-delicate spring-arm O. By preference this is formed of a light strip of clock-spring steel, although any suitable material may be used for this arm and it may be of any suitable shape. Normally it extends at an inclination toward and across the letter-path, having an orifice or slot at O' in the wall B, into and out from which the end of this arm O can swing. As the letter approaches the position where it is to be printed or marked it impinges upon this arm O and the latter is pushed in the direction of the letter travel. As it moves in that direction it causes the pin $l$ and the roll-carrier $l'$ to swing on the pivot at $m$ and to bring the platen-roll L to that radial line of the die which passes through the pivot at $m$, and when the platen-roll reaches this line it is in the position of greatest efficiency. At P there is a stationary stop which prevents the carrier $l'$ from taking the roll L beyond said radial line. The arm O, however, being itself elastic or held by a spring can move somewhat farther in the last said direction, and it does so move when the releasing device H pushes the letter free from stop or shoulder $b$, for then the advancing letter continues its pushing action on the arm O, carrying it entirely outside of the slot O', and the letter holds the arm O in this its furthermost position until its rear edge passes the arm, whereupon its resiliency or its spring causes it instantly to fly back into the slot O' and across the letter-path ready for the impact of the next coming letter, and at the instant of its release from the rear end of the last preceding letter the spring at Q, which has been under tension, comes into action and quickly returns the support $l'$ and the roll L to their inactive position and holds them there until another letter strikes the arm O and brings the roll into working position opposite to the die. The simple mechanism thus provided enables me to dispense with the more or less complicated mechanisms that have been heretofore used for this purpose, such as levers, links, toggle-joints, slide-guides, &c. By examining Fig. 18 it will be seen that the wall B is near its lower edge provided with a passage-way $b^4$ for the projecting segment of the die and is also recessed somewhat farther, as shown at $b^5$.

Inasmuch as this machine when considered as a whole is mainly characterized by the presence of a letter-feeding device adapted to maintain a substantially-continuous frictional feeding force to a face of the letter without break in such force from the time the letter first starts from the initial receiving passage-way until it reaches the final receptacle, it becomes advantageous to have means for creating as much of such frictional force as any circumstances will require, although not so much as to prevent the necessary amount of slipping of the feeding device while in contact with the letter or paper. I herein provide not only for an increase of this frictional grip of the feeder, (which in this case I illustrate as a belt, more or less flexible,) but for a regulation thereof by means of devices which shall hold the feeding device against the opposing wall with more or less pressure, as desired. The belt pulley or drum D is mounted upon a spring-held carrier bar or plate R, which is pivoted at $r$ to the frame or base-plate. The spring S acts so as to tend to move the belt-wheel D toward the wall B, thereby increasing the gripping action of the belt itself, but permitting it to yield in case of severe pressure caused by the entrance into the passageway of an unusually thick letter or package. The extent, however, to which the wheel D and the belt can move is limited by an adjustable stop consisting of a lug or ear T on the carrier R and an adjusting-screw U, mounted in a threaded holder at V.

In addition to the parts above described for properly holding the belt I employ also a tightener for maintaining the proper tautness or stretch of the belt with relation to its supporting-wheels. This consists of an idler pulley or roll W, bearing against the idle side of the belt and carried by an arm $w$, pivoted at $w'$ and adjustable to the desired position by means of the screw $w^2$ and a set-nut $w^3$. The pulley D' of the belt is also used as a stacker device, it having flexible fingers Y Y, which act to push the letters outward after they come from the printing mechanism in the well-known way. At Z there is an adjustable stop-wall, against which the letters that are thrown out by the belt impinge and which can be put at any place to correspond with the length of the letters that are being operated on.

What I claim is—

1. In a machine of the class described, the combination with the printing device, and the letter-advancing mechanism, of a stationary wall forming a guide for the letters to and from the impression-point said wall having formed thereon a stop projecting across the letter-path, and an automatically-acting releasing device which pushes the letter away from said stop, substantially as set forth.

2. In a machine of the class described, the combination with the printing device, and the letter-advancing mechanism, of a stationary wall forming a guide for the letters to and from the impression-point said wall having formed thereon a stop projecting across the letter-path, and an automatically-acting releasing device reciprocating through the said wall to push the letter away from said stop, substantially as set forth.

3. In a machine of the class described, the combination with the printing device, and the letter-advancing mechanism, of a stationary wall forming a guide for the letters to and from the impression-point, said wall formed into a stop across the letter-path, and an automatically-acting pusher carrying a plurality of presser-plates adapted to reciprocate through apertures in the said wall to push the letters away from the stop thereon, substantially as set forth.

4. In a machine of the class described, the combination with the letter-advancing mechanism, of a stationary wall forming a guide for the letters to and from the impression-point, said wall having formed thereon a stop projecting across the letter-path, an automatically-acting pusher adapted to reciprocate through the said wall to push the letters away from the stop thereon, and a printing device also passing through an aperture in said wall to contact with the letters, substantially as set forth.

5. In a machine of the class described, the combination with the letter-advancing mechanism, of a stationary wall forming a guide for the letters to and from the impression-point, said wall formed into a stop across the letter-path, an automatically-acting pusher carrying a plurality of presser-plates adapted to reciprocate through apertures in the said wall to push the letters away from the stop thereon, and a printing device also passing through an aperture in said wall to contact with the letters, substantially as set forth.

6. In a machine of the class described, the combination of the printing device on one side of the letter-path, the letter-advancing device on the other side of the letter-path, the stationary stop on the same side of the letter-path as the printing device, and the pressure-plate on the same side of the letter-path as the feeding device, and adapted to move bodily toward and from the letter-path and also adapted to have either end move toward and from the letter-path more or less independently of the other end, substantially as set forth.

7. In a machine of the class described, the combination with the printing device, the letter-advancing mechanism, and a stationary stop in the letter-path, of a yielding pressure-plate adapted to bear throughout its length against one face of the letter, said plate terminating at the stationary stop and adapted to normally lie within the detaining-face of said stop, and a releasing device adapted to bear against the opposite face of the letter and push it out of the line of said stop, substantially as set forth.

8. In a machine of the class described, the combination with a letter-advancing belt, of a stationary wall against which the letter is forced by said belt, said wall projecting above said belt and having formed thereon a fixed stop projecting across the path of travel of said belt and above the same, a pusher adapted to reciprocate through the said wall to push the letters away from the stop thereon, and a printing device also passing through an aperture in said wall to contact with the letters, substantially as set forth.

9. In a machine of the class described, the combination with the printing device, and the letter-advancing mechanism, of a stationary wall opposed to the letter-advancing mechanism and provided with a passage-way, said wall having formed thereon a stationary stop projecting across the letter-path, and a letter-releasing device arranged to move through the said passage-way in said wall to push the letter away from said stop, substantially as set forth.

10. The combination of the printing device, the letter-advancing device, the stationary wall opposed to the letter-advancing device and provided with a series of slots or passages, the stationary stop in the letter-path and the releasing device having a series of letter-engaging fingers or plates movable through the said slots or passages, substantially as set forth.

11. In a machine of the class described, the combination with the printing device, and the letter-advancing mechanism, of a yielding pressure-plate adapted to bear against one face of the letters, and a carrier-arm on which said plate is pivotally mounted intermediate its length, said carrier-arm being pivoted to the machine-frame and spring-pressed toward the path of the letters, substantially as set forth.

12. In a machine of the class described, the combination with the printing device, and the letter-advancing mechanism, of a yielding pressure-plate adapted to bear against one face of the letters, a carrier-arm pivoted to the machine-frame and on which said plate is pivotally mounted intermediate its length, a spring exerting its tension on said carrier-arm toward the path of the letters, and a segment-plate with which the free end of said spring is adjustably engaged to vary the tension on said carrier-arm, substantially as set forth.

In testimony whereof I affix my signature in presence of two witnesses.

CHAS. V. FYKE.

Witnesses:
FRANK E. DENNETT,
N. CURTIS LAMMOND.